(12) United States Patent
Toniolo

(10) Patent No.: US 12,348,185 B1
(45) Date of Patent: Jul. 1, 2025

(54) INTEGRATED HYBRID SOLAR ENERGY PLANT AND DISTRICT HEATING AND COOLING NETWORK

(71) Applicant: Schlumberger Technology Corporation, Sugar Land, TX (US)

(72) Inventor: Julien Toniolo, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/764,473

(22) Filed: Jul. 5, 2024

(51) Int. Cl.
*H02S 40/44* (2014.01)
*F24S 10/95* (2018.01)
*F24S 40/55* (2018.01)
*H02S 40/42* (2014.01)

(52) U.S. Cl.
CPC ............ *H02S 40/44* (2014.12); *F24S 10/95* (2018.05); *F24S 40/55* (2018.05); *H02S 40/42* (2014.12)

(58) Field of Classification Search
CPC .......... H02S 40/44; H02S 40/42; F24S 10/95; F24S 40/55
See application file for complete search history.

(56) References Cited

U.S. PATENT DOCUMENTS

| | | | |
|---|---|---|---|
| 2021/0336582 A1* | 10/2021 | Lasich | F01K 3/12 |
| 2022/0154974 A1* | 5/2022 | Paavola | F23J 15/006 |
| 2022/0341605 A1* | 10/2022 | Karng | F24F 5/0046 |
| 2023/0115349 A1 | 4/2023 | Scapini et al. | |
| 2023/0353079 A1* | 11/2023 | Biggers | F03G 6/004 |

FOREIGN PATENT DOCUMENTS

| | | | | |
|---|---|---|---|---|
| CN | 103986415 A | 8/2014 | | |
| CN | 108625913 B | 10/2018 | | |
| CN | 117852706 A | 4/2024 | | |
| KR | 2018005471 A | * | 1/2018 | ......... H04W 56/001 |
| KR | 20180055471 A | * | 5/2018 | |
| WO | 2007030715 A2 | 3/2007 | | |

OTHER PUBLICATIONS

English Translation KR 20180055471 A (Year: 2018).*
English Translation KR-2018005471-A (Year: 2018).*
Al-Sayyab et al Renewable and waste heat applications for heating, cooling, and power generation based on advanced configurations, Energy Conversion and Management , ELSEVIER, vol. 291 , ppl -26, Pub Jun. 24, 2023, ISSN 0196-8904,. A/N: XP087365925 (XPESO), 24231187 (Inspec). doi:10.1016/j.enconman.2023. see paragraph 6.1; p. 2, col. 2-p. 3, col. 1; p. 4; fig 4.
Combined Search and Examination Report issued Jan. 24, 2025 regarding GB Patent Application GB2411344.1_10 pages.

* cited by examiner

*Primary Examiner* — Shafiq Mian
(74) *Attorney, Agent, or Firm* — Jeffrey D. Frantz

(57) ABSTRACT

A system may include a solar thermal collector including a photovoltaic (PV) module, wherein the solar thermal collector is configured to convert a first portion of sunlight to thermal energy and a second portion of the sunlight to electrical energy. A system may include a thermal cycle generator configured to generate electricity including a generator working fluid, wherein the generator working fluid receives heat from the solar thermal collector and exhausts heat to a district working fluid. A system may include a district working fluid ring of a district heating and cooling network (DHCN) configured to receive heat from the thermal cycle generator with the district working fluid therein.

14 Claims, 8 Drawing Sheets

INTEGRATED HYBRID SOLAR ENERGY PLANT AND DISTRICT HEATING AND COOLING NETWORK

CROSS-REFERENCE TO RELATED APPLICATIONS

N/A

BACKGROUND

Renewable energy usage is growing rapidly all over the world as humanity tries to decarbonize sources of energy. However, the two most common forms of renewable energy, solar and wind, are intermittent. For these sources to provide a steady amount of energy throughout the day, energy storage is required. The energy storage can be electrical energy storage, thermal energy storage, or both.

SUMMARY

In some aspects, the techniques described herein relate to a system for providing electrical power, the system including: a solar thermal collector including a photovoltaic (PV) module, wherein the solar thermal collector is configured to convert a first portion of sunlight to thermal energy and a second portion of the sunlight to electrical energy; a thermal cycle generator including a generator working fluid, wherein the generator working fluid receives heat from the solar thermal collector and exhausts heat to a district working fluid; and a district working fluid ring of a district heating and cooling network (DHCN) configured to receive heat from the thermal cycle generator with the district working fluid therein.

In some aspects, the techniques described herein relate to a system for providing electrical power, the system including: a solar thermal collector including a photovoltaic (PV) module, wherein the solar thermal collector is configured to convert a first portion of sunlight to solar thermal energy and a second portion of the sunlight to solar electrical energy; an organic Rankine cycle (ORC) generator including a generator working fluid, wherein the generator working fluid receives heat at an evaporator that is heated at least partially by the solar thermal energy and exhausts heat to a district working fluid; and a district working fluid ring of a district heating and cooling network (DHCN) configured to receive heat from the ORC generator with the district working fluid therein.

In some aspects, the techniques described herein relate to a method of providing electrical power, the method including: generating solar electrical power with a PV module of a solar thermal collector; collecting solar thermal energy from the solar thermal collector; heating a generator working fluid with the solar thermal energy; generating organic Rankine cycle (ORC) electrical power in an ORC generator; and cooling the generator working fluid with a district working fluid ring of a district heating and cooling network (DHCN).

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and aspects of embodiments of the disclosure will be set forth in the description which follows, and in part will be obvious from the description, or may be learned by the practice of such embodiments. The features and aspects of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, non-schematic drawings should be considered as being to scale for some embodiments of the present disclosure, but not to scale for other embodiments contemplated herein. Understanding that the drawings depict some example embodiments, the embodiments will be described and explained with additional specificity and detail through the use of the accompanying drawings in which.

DETAILED DESCRIPTION

Figure 1:
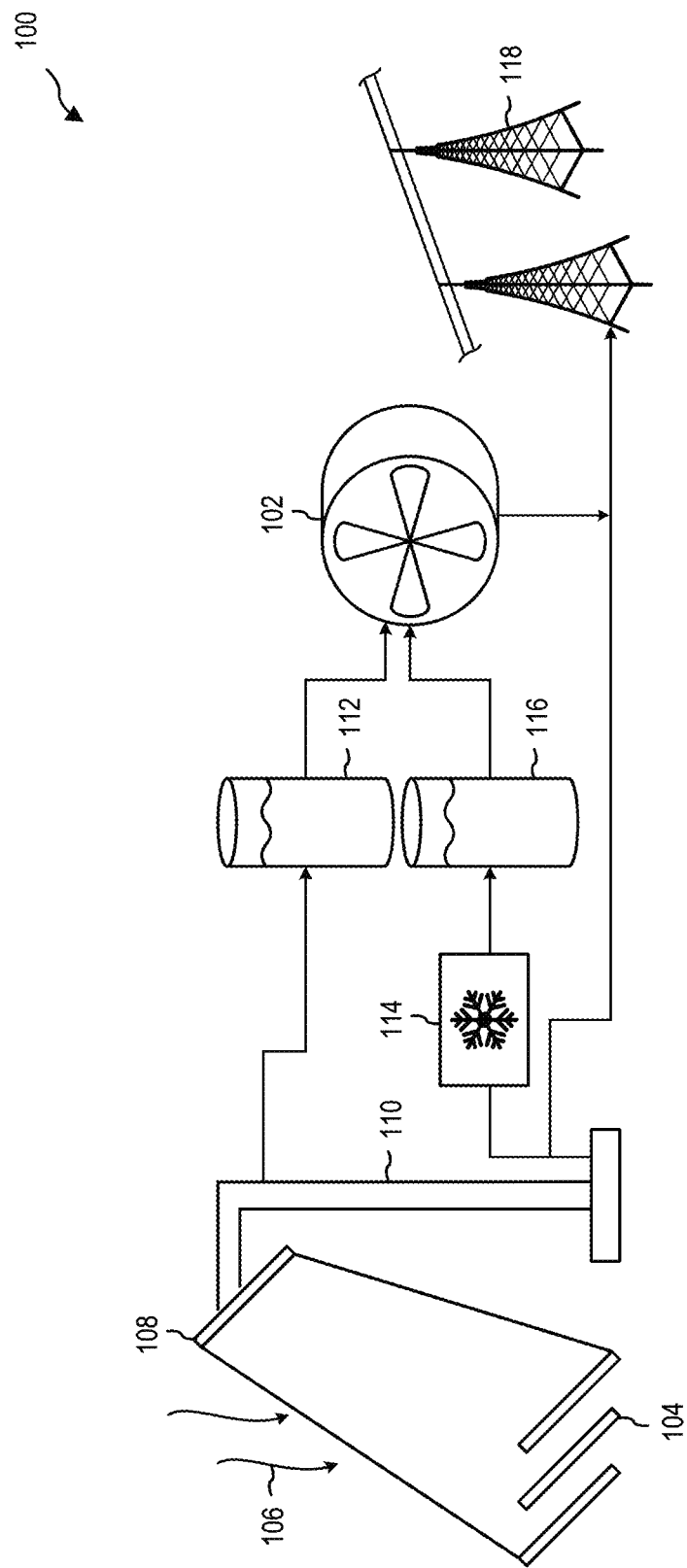
FIG. 1 is a schematic representation of a concentrated solar energy system, according to at least some embodiments of the present disclosure.

Embodiments of the present disclosure generally relate to energy generation and storage. More particularly, the present disclosure relates to electrical and thermal energy generation and storage from solar energy. In some embodiments, renewable energy sources, such as solar energy, are intermittent energy sources and dependent on weather or time of day. Renewable energy sources, therefore, can store at least a portion of the energy produced or captured for later distribution or dispensation based on local or regional needs.

Short-term energy storage is storage of energy (thermal, mechanical, electrical, chemical, etc.) for no more than 4 hours of time. For example, lithium-ion batteries, on a large scale, become economically unviable for storage durations of greater than 4 hours. Lithium-ion batteries are generally used for short-term energy storage. Other forms of energy storage can be more economical on intermediate-term and/or long-term scales. For example, pumped hydrological energy storage allows for the conversion of available energy (such as during periods of sunlight or wind) to gravitational potential energy of a mass of water that is pumped vertically upward, such as to a reservoir uphill or into a tower. Thermal energy storage stores energy as heat and converts a temperature difference to energy through a Rankine cycle. Thermal energy storage can offer longer-term storage than lithium-ion batteries and provide additional integration with local and regional systems for distribution of the thermal energy. In some embodiments, at least a portion of the thermal energy is converted to electrical energy through a thermal cycle generator (e.g., Kalina cycle, Rankine cycle). In some embodiments, at least a portion of the thermal energy is distributed to heat other devices and/or systems.

In some embodiments, systems and methods according to the present disclosure use a thermal cycle, such as an organic Rankine cycle (ORC), to convert a temperature difference into energy. A thermal cycle generator uses a difference in temperature to drive a heat-to-power engine through the expansion of a generator working fluid. This generator may be used to provide power to the grid when solar modules are unable to generate power (at nighttime or on cloudy days) or wind turbines are unable to turn.

A thermal cycle generator converts a temperature differential between a high temperature heat source and a low-temperature heat sink into mechanical energy, which may be converted to electrical energy and exported to a power grid or stored in another form of energy storage, such as a short-term or long-term battery storage device. For example, the thermal storage may use a mass of fluid, such as water, that is heated (for the high temperature heat source) and a second mass of fluid, such as water, that is cooled (for the low-temperature heat sink). For example, a high temperature thermal storage or heat source is maintained at or near the boiling temperature of water (or other fluid) and a low-temperature thermal storage is stored at or near the freezing temperature of water (or other fluid), such as in an ice slurry. In such examples, the temperature difference between the hot water and cold water storage is, therefore, at or near a maximum at atmospheric pressure. In other examples, the high temperature thermal storage or heat source is maintained at or near the boiling temperature of water (or other fluid) and a low-temperature thermal storage is stored at or near an ambient temperature or a subsurface (e.g., underground) temperature to limit power consumption for cooling.

In some embodiments, the low-temperature thermal storage is or is in thermal communication with a fifth-generation district heating and cooling network (DHCN). The DHCN includes a cool-temperature ring and a warm-temperature ring that, respectively, provide cold and warm water to local structures and may provide climate control (i.e., heating and cooling) to local structures (such as buildings) through heat pumps connected to the warm-temperature ring and the cool-temperature ring. In some embodiments, the warm-temperature ring is in a range of 10° C. and 30° C. In some embodiments, the cool-temperature ring is in a temperature range of 0° C. to 15° C. In some embodiments, the heat pump(s), thermal cycle generator(s), and/or thermal storage devices move heat between the rings, the ambient environment (including structures), and the storage devices to maintain the temperatures of the rings and the temperature difference between the rings. The heat pumps may draw heat from the warm-temperature ring and/or transfer heat to the cool-temperature ring as demanded from individual heat pumps and/or buildings. Thermal communication is, for example, when a heat sink is in direct contact with a heat source by convection, conductive, or radiative thermal transfer. In some embodiments, thermal communication is provided indirectly by a thermal transfer medium, such as a working fluid flowing through a fluid conduit between heat exchangers.

In some embodiments, the cool-temperature ring is the low-temperature thermal storage for the thermal cycle generator of the system. The cool-temperature ring of a DHCN is an conduit (such as an underground) that is relatively thermally-stable. In some embodiments, the warm-temperature ring is in thermal communication with a solar thermal collector of the solar energy system that provides heat to the warm-temperature ring and/or a high-temperature thermal storage. In some embodiments, the solar energy system includes independent high-temperature thermal storage and cool-temperature thermal storage that selectively provide heat or coolth to the warm-temperature ring and/or cool-temperature ring of the DHCN. In some embodiments, a heat exchanger of the thermal cycle generator cools a generator working fluid of the thermal cycle generator by transferring heat directly to a fluid in at least one of the warm-temperature ring and the cool-temperature ring of the DHCN (e.g., water).

FIG. 1 illustrates such an example of a system 100 including a thermal cycle generator (such as an ORC generator 102) for collection of solar electrical energy and solar thermal energy. Such a system associates the ORC with a solar energy harvesting system. One or more mirrors 104 direct sunlight 106 onto a solar thermal collector, such raised photovoltaic (PV) modules 108 supported by a PV module tower 110, that are actively cooled by water circulated through the PV module tower 110. The PV modules 108 convert the sunlight 106 to energy with approximately 90% efficiency, with about 30% of the sunlight energy converted to electricity by the PV modules 108 and about 60% converted to heat. The heat is captured by the circulating water stream, and the heat is stored in a nearby water reservoir that is the hot energy storage (HES) 112 or heat source for the ORC generator 102. The PV electricity (or the grid) is used to power a refrigeration system 114 to cool water in a second reservoir that is the cold energy storage (CES) 116. Excess electricity produced by the ORC generator 102 may be used to power a load, for instance sold to power local systems and/or sold to a power grid 118.

In some embodiments, the HES 112 is configured to maintain a hot temperature in a range of 70° C. to 100° C. In some embodiments, the HES 112 is configured to maintain a hot temperature in a range of 80° C. to 100° C. In some embodiments, the HES 112 is configured to maintain a hot temperature in a range of 90° C. to 100° C. In some embodiments, the CES 116 is configured to maintain a cold temperature in a range of 0° C. to 30° C. In some embodiments, the CES 116 is configured to maintain a cold temperature in a range of 0° C. to 20° C. In some embodiments, the CES 116 is configured to maintain a cold temperature in a range of 0° C. to 10° C. The two insulated storage reservoirs, HES 112 and CES 116, maintain a temperature difference of approximately 90° C.

Figure 2:
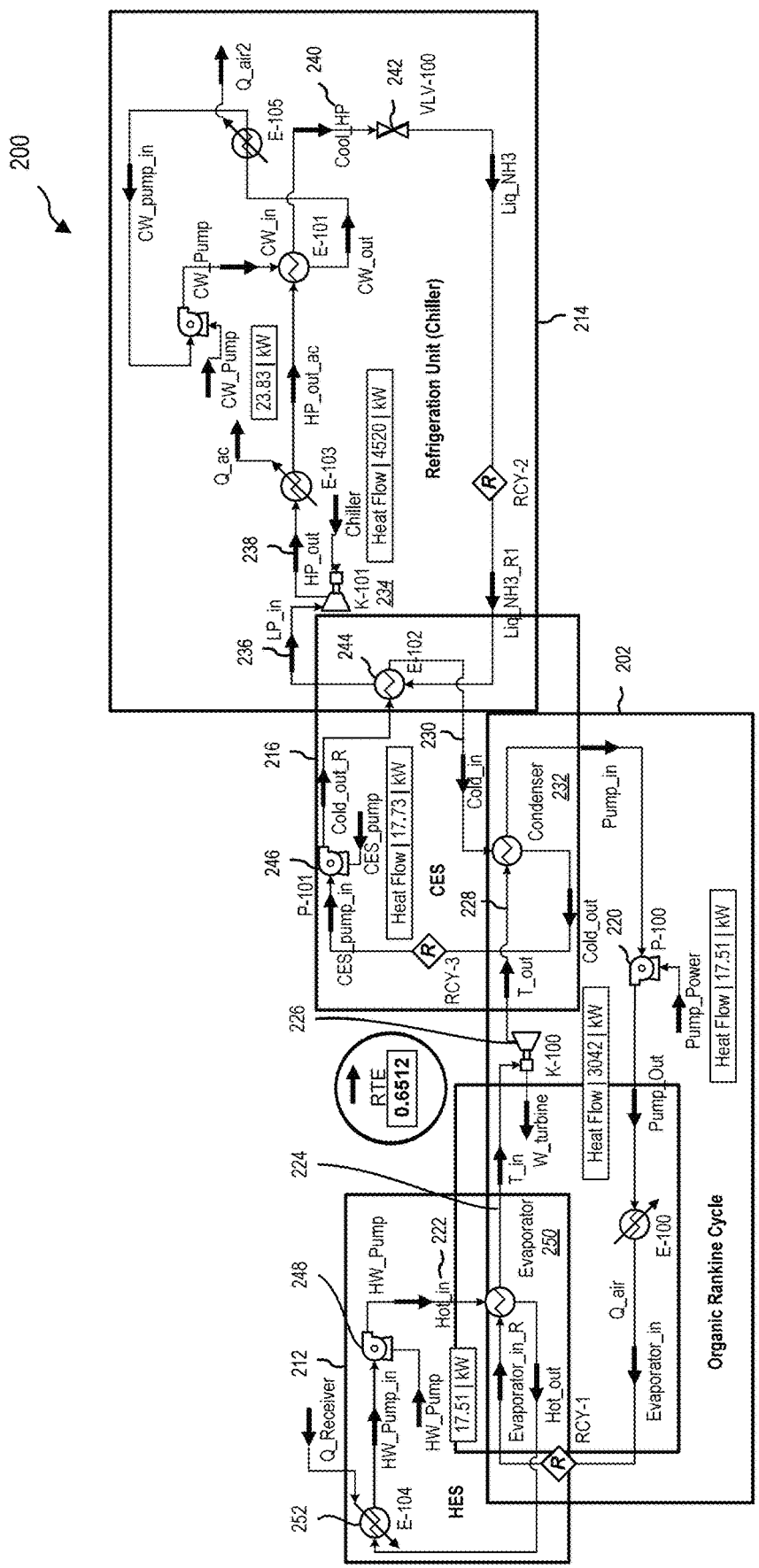
FIG. 2 is a flow diagram of energy in a concentrated solar energy system, according to at least some embodiments of the present disclosure.

FIG. 2 is a simulation diagram for an energy storage aspect of another system 200 including an ORC generator 202 (e.g., thermal cycle generator 102 of FIG. 1). The ORC generator 202 is in thermal and hydraulic communication with an HES 212 and a CES 216 to provide the temperature differential to the ORC generator 202. FIG. 2 represents a steady state process, and in the simulation illustrated, the refrigeration provided by the chiller 214 is matched to the condenser duty in the ORC generator 202. In some embodiments, a generator working fluid is ammonia. In the simulation, ammonia is used as both the generator working fluid and as a refrigeration fluid in the chiller 214.

For the ORC generator 202, Pump P-100 220 using Pump_Power increases the pressure of the generator working fluid (e.g., liquid ammonia) stream, which is the outlet stream labeled as Pump_out in FIG. 2. This outlet stream is first heated by ambient air (E-100) and then by a hot water stream (Hot_in) 222 from the HES 212. At this point, the turbine inlet T_in stream 224 is converted into a high-pressure vapor stream. The turbine inlet T_in stream 224 is expanded across expander K-100 226 to extract work. Turbine outlet T_out stream 228 is cool and is condensed by cold water from the CES 216. The Cold_in inlet 230 delivers cold water to the condenser 232. This generator working fluid is condensed in the condenser 232 and forms the inlet stream to the Pump P-100 220 to complete the ORC.

Referring now to the chiller 214, the compressor K-101 234 is used to compress the cool ammonia stream at the low-pressure LP_in inlet 236 using Chiller power. In some embodiments, the hot high-pressure refrigeration fluid stream at the HP_out outlet 238 is cooled in an air-cooled heat exchanger E-103 and an optional water-cooled heat exchanger E-101 to create the refrigeration fluid stream Cool_HP 240. In some embodiments, the cooling water loop includes a pump CW_Pump and air-cooled heat exchanger E-105. The refrigeration fluid stream Cool_HP 240, at saturated conditions, is expanded across a thermo-expansion valve VLV-100 242 into the two-phase region on an ammonia phase diagram. This cold ammonia stream is used to cool the water stored in CES by exchanging heat in the heat exchanger E-102 244.

The cold-water loop is shown in the CES 216. In some embodiments, the cold-water loop includes a pump P-101 246 to offset the pressure drop in heat exchangers E-102 244 and the condenser 232. In some embodiments, the pump P-101 246 uses energy CES_Pump. In some embodiments, the hot water loop is in the HES 212. In some embodiments, the hot water loop comprises a pump HW_Pump 248 using an energy stream HW_Pump to offset the pressure drop in heat exchanger Evaporator 250 and heat exchanger E-104 252.

Round-trip efficiency (RTE) for the ORC is defined as electric power generated by the ORC divided by total electric power used. This number is calculated based on a ratio of the turbine power output in watts to the total power consumed by other pumps and compressors in the system:

RTE=W_turbine/(HW_Pump+Pump_Power+Chiller+ CW_Pump+CES_Pump)

An increase in RTE is desirable for any energy storage process. In fact, a high RTE and availability of energy for an extended period of time are the primary metrics used for development of a successful storage process.

As described herein, the RTE is based at least partially on the temperature difference between the HES storage temperature and the CES storage temperature. Reducing the temperature difference reduces the RTE, which may be undesirable. In the illustrated and described simulation of FIG. 2, the additional power consumption of the chiller 214 to cool the water of the CES 216 sufficiently improves the RTE, thereby justifying the use of the chiller 214. In some embodiments, simplifying and/or limiting components of the system is beneficial, such as by exhausting heat to a DHCN, thereby limiting or removing the need for a chiller.

Figure 3:
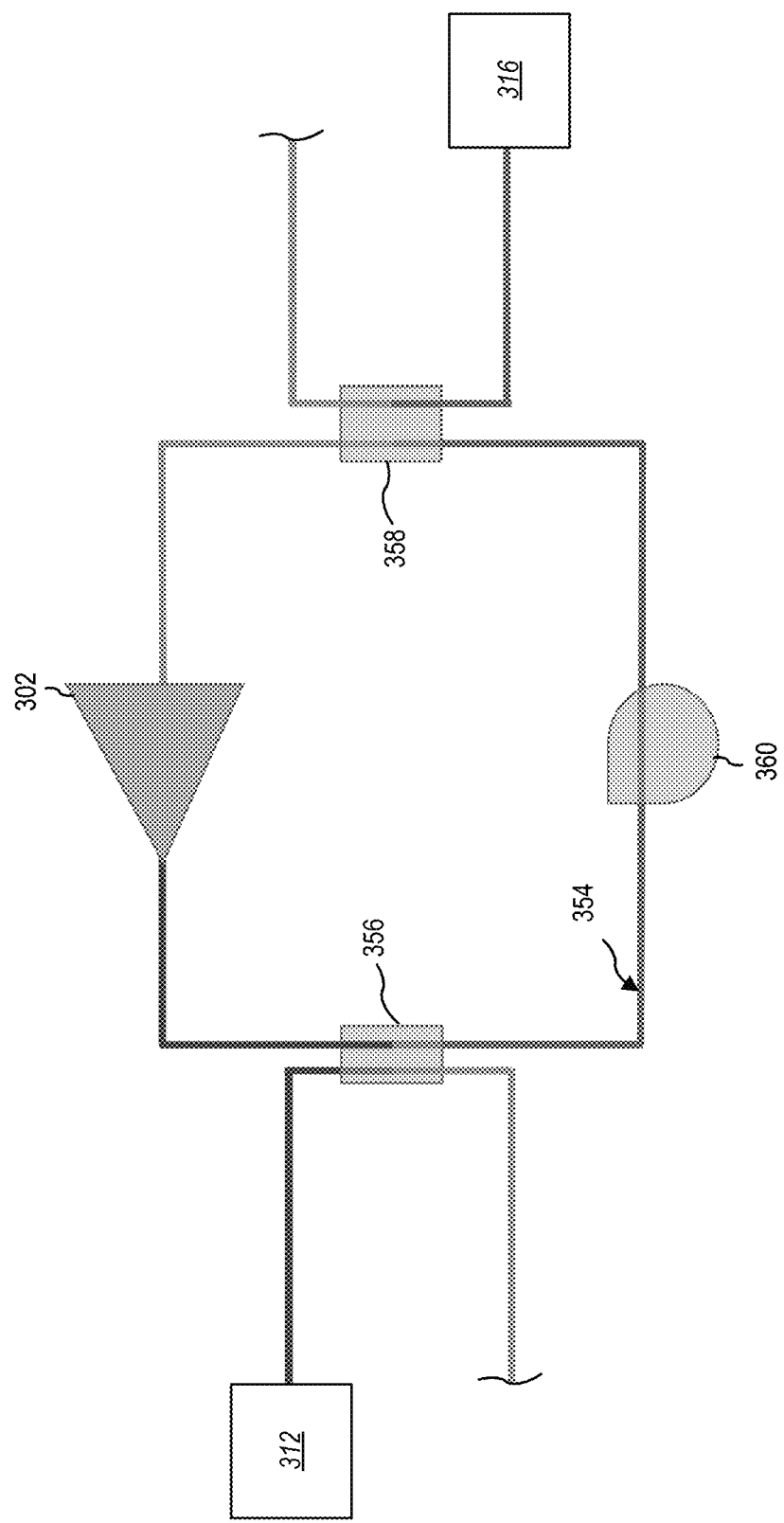
FIG. 3 is a system diagram of a thermal cycle generator and system, according to at least some embodiments of the present disclosure.

FIG. 3 is a schematic diagram illustrating a thermal cycle generator 302 that generates electricity from a temperature difference in a generator working fluid 354. The generator working fluid has its pressure increased by a pump 360 and then receives heat from the HES 312 at an evaporator 356 to heat the generator working fluid 354 so that it evaporates. The expansion of the generator working fluid 354 taking place in the turbine applies a mechanical torque to the thermal cycle generator 302, which converts the mechanical energy to electrical energy (such as via an electrical generator driven by the turbine). The generator working fluid 354 then exhausts heat at a condenser 358. The condenser 358 is, in some embodiments, cooled by a CES 316. The generator working fluid 354 is then cycled through the system back toward the evaporator 356. The thermal cycle of expansion and condensation of the generator working fluid convert the temperature difference between the HES 312 and the CES 316 to mechanical, and then electrical, energy.

In some embodiments, the generator working fluid 354 is heated by the HES 312. In some embodiments, the generator working fluid 354 is heated directly from a solar thermal collector, such as described in relation to FIG. 1. For example, a transfer working fluid may receive solar thermal energy from the solar thermal collector and transfer the solar thermal energy to the evaporator 356 without (or bypassing) the HES 312. In some embodiments, a system according to the present disclosure operates in plurality of modes to selectively heat the generator working fluid 354 directly from the solar thermal collector or indirectly heat the generator working fluid 354 from the HES 312 (which may be at least partially heated by the solar thermal collector).

In some embodiments, the CES 316 is a district fluid ring of a DHCN. For example, the district fluid ring may be a conduit, such as an underground conduit that flows the district working fluid therethrough. The reservoir of district working fluid may remain substantially stable in temperature and provide a relatively constant CES 316. In some embodiments, the district fluid ring is a warm-temperature fluid ring. In some embodiments, district fluid ring is a cool-temperature fluid ring.

In some embodiments, one or both of the HES 312 and CES 316 is a fluid tank that contains a fluid mass to store the thermal energy at a substantially stable temperature. In some embodiments, one or both of the HES 312 and CES 316 includes a fluid pit (e.g., in-ground or underground) that contains a fluid mass to store the thermal energy at a substantially stable temperature. In some embodiments, one or both of the HES 312 and CES 316 includes a solid thermal mass that stores the thermal energy at a substantially stable temperature. For example, the solid thermal mass may be a metallic thermal mass. In some examples, the solid thermal mass includes a mass of concrete. In some examples, the solid thermal mass includes a mass of sand. In some embodiments, one or both of the HES 312 and CES 316 includes a natural structural or thermal mass that stores the thermal energy at a substantially stable temperature. For example, one or both of the HES 312 and CES 316 may include a geothermal well that stores the thermal energy in an earthen formation underground. In some examples, one or both of the HES 312 and CES 316 includes a naturally-occurring water reservoir (surface water or subsurface water).

Figure 4:
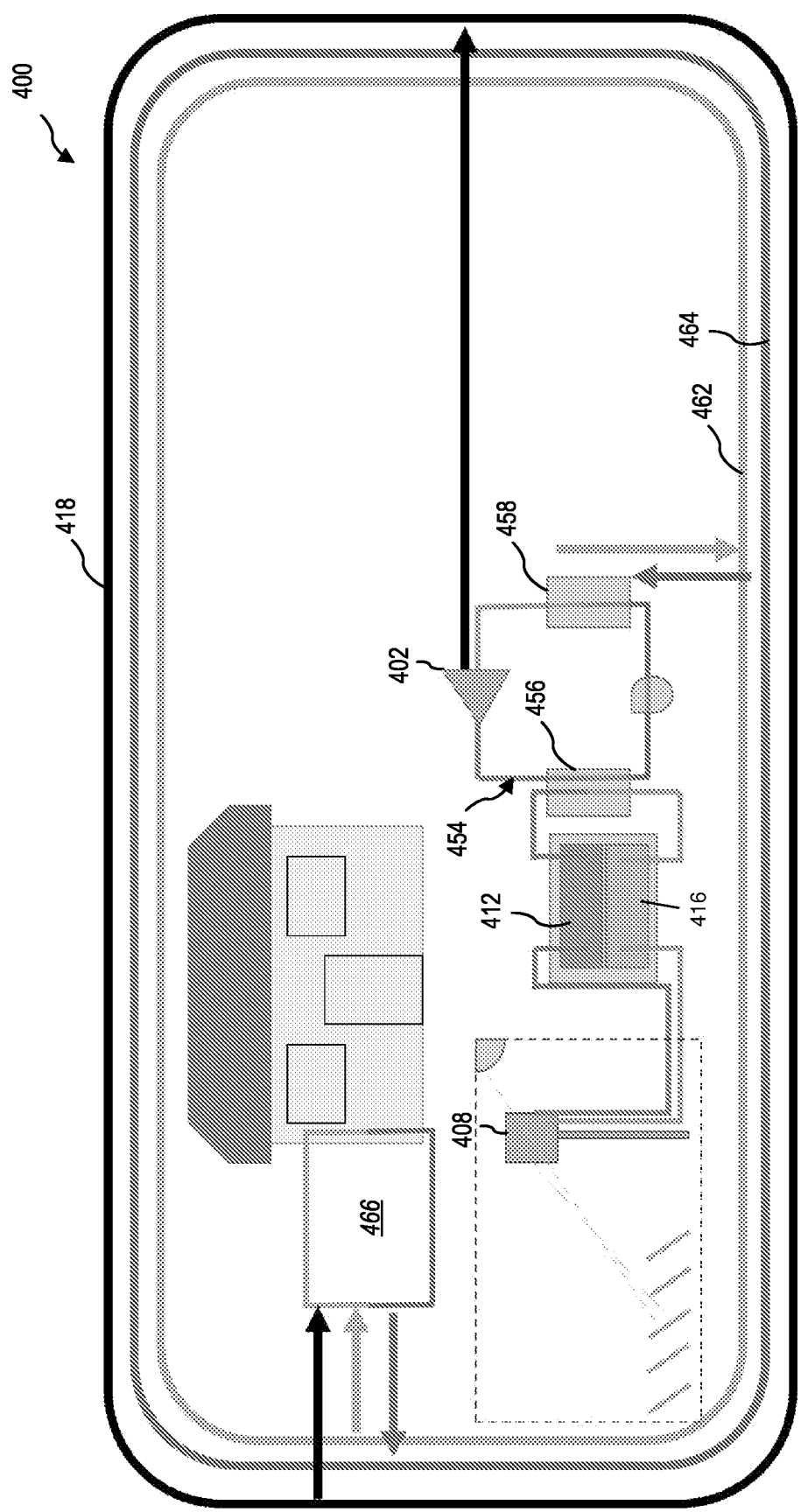
FIG. 4 is a schematic diagram of energy in an integrated concentrated solar energy and district heating and cooling network, according to at least some embodiments of the present disclosure.

FIG. 4 illustrates an embodiment of a concentrated solar PV/thermal hybrid generator integrated with a DHCN. For example, the PV module 408 harvests solar electrical energy and solar thermal energy. The solar thermal energy is, in some embodiments, provided to an HES 412. The solar thermal energy and/or HES 412 heats a generator working fluid 454 and a cool-temperature fluid ring 464 of the DHCN cools the generator working fluid 454.

The generator working fluid 454 is heated at the evaporator 456 before being expanded at the turbine coupled to the electrical generator and forming the thermal cycle generator 402. The generator working fluid 454 is cooled and condensed at the condenser 458 after the thermal cycle generator 402. In some embodiments, the temperature difference between the HES 412 and the cool-temperature fluid ring 464 is converted to generator electrical energy by the thermal cycle generator 402. The thermal cycle generator 402 may export the electrical energy to a regional power grid 418 or to another storage device, such as a short-term storage device or a long-term storage device, as needed.

In some embodiments, the cool-temperature fluid ring 464 is part of a DHCN that provides heat to one or more structures. In some embodiments, the structure includes a heat pump 466 that provides climate control to the structure based at least partially on a warm-temperature fluid ring 462 of the DHCN and the cool-temperature fluid ring 464. For example, the heat pump 466 may transfer heat from the warm-temperature fluid ring 462 of the DHCN to the structure to warm the structure (via an intermediate working fluid circuit). In some embodiments, the heat pump 466 consumes electrical power from the regional power grid 418 that is supplied, at least partially, by the thermal cycle generator 402. In some embodiments, the thermal cycle generator 402 is activated based on one or more parameters. In some embodiments, the one or more parameters include a temperature of the cool-temperature fluid ring 464. For example, the thermal cycle generator 402 may be activated in response to a temperature of the cool-temperature fluid ring 464 being below a threshold value for efficient thermal cycle generator operation. In some embodiments, the one or more parameters include a temperature difference between the warm-temperature fluid ring 462 and the cool-temperature fluid ring 464. For example, the thermal cycle generator 402 may be activated when the temperature difference is above a second threshold. In such a case, the heat pump may be powered by the regional power grid when the thermal cycle generator 402 is not activated. The heat pump includes a working fluid circuit in which a working fluid undergoes thermal cycle. The working fluid circuit has a first heat exchanger in which heat is exchanged with the working fluid via the warm fluid ring or cold fluid ring, a compressor to compress the working fluid, a second heat exchanger in which heat is exchanged between the working fluid and a building fluid circuit, and an expander. In a heating mode, the first heat exchanger works as an evaporator and the working fluid circuit receives heat from the warm fluid ring. The DHCN fluid that has gone through the first heat exchanger from the warm fluid ring may be redirected to the cold fluid ring. The working fluid, after having circulated in the first heat exchanger may be directed to the compressor, and then to the second heat exchanger that works as a condenser and transfers heat from the working fluid to the building fluid, therefore heating the building. Then, the working fluid is directed to the expander and cycle through the first heat exchanger once more. In a cooling mode, the second heat exchanger works as an evaporator and the working fluid circulating in the second heat exchanger receives heat from the building fluid (therefore cooling the building). The working fluid is then directed to the compressor and then to the first heat exchanger that works as a condenser and transfers heat from the working fluid to the DHCN fluid. The DHCN fluid goes through the first heat exchanger from the cold fluid ring and may be redirected to the warm fluid ring at the exit from the first heat exchanger. The working fluid is then directed to the expander and cycles through the second heat exchanger once more. The heating and cooling modes may be provided using the same equipment, with valves and/or other fluid distribution devices that reverse the working fluid circuit. Such reversible heat pumps are known from the one of ordinary skill and will not be further detailed in this disclosure.

In some embodiments, the CES is the warm-temperature fluid ring 462. For example, the condenser 458 may exhaust heat from the generator working fluid 454 to the warm-temperature fluid ring 462. While the cool-temperature fluid ring 464 may provide a larger temperature difference with the HES 412 than the warm-temperature fluid ring 462, it may be beneficial to the DHCN to heat the warm-temperature fluid ring 462 with exhaust heat from generator working fluid 454 after the thermal cycle generator 402. In some embodiments, the condenser 458 exhausts heat from the generator working fluid 454 to water or other fluid from the cool-temperature fluid ring 464, and the heated fluid is then added to the warm-temperature fluid ring 462.

In some embodiments, a chiller is configured to cool the cool-temperature fluid ring 464. In some embodiments, the chiller is a compression chiller. In some embodiments, the chiller is an absorption chiller. For example, the system 400 may include a chiller or other cooling system to cool the fluid before the condenser 458. In some embodiments, the chiller is configured to cool the fluid of the cool-temperature fluid ring 464. In some embodiments, the chiller is powered by the regional power grid 418. In some embodiments, the chiller is powered at least partially by the thermal cycle generator 402. In some embodiments, the chiller is powered directly by the thermal cycle generator 402. In some embodiments, the chiller is activated based on one or more parameters. In some embodiments, the one or more parameters include a temperature of the cool-temperature fluid ring 464. For example, the chiller may be activated in response to a temperature of the cool-temperature fluid ring 464 being above a third threshold value. In some embodiments, the one or more parameters include a temperature difference between the warm-temperature fluid ring 462 and the cool-temperature fluid ring 464. For example, the chiller may be activated when the temperature difference is above a fourth threshold.

As described herein, in some embodiments, the thermal cycle generator 402, the chiller, or other components of the system 400 are operated at least partially based on threshold temperatures of the cool-temperature fluid ring 464, the warm-temperature fluid ring 462, the HES 412, CES 416, other components of the system, or combinations thereof. Operating the system 400 or parts of the system based on temperature thresholds allows the system 400 to operate when thermodynamically efficient.

In some embodiments, the thermal cycle generator 402 operates based on an electrical demand from one or more loads. In some embodiments, the thermal cycle generator 402 operates based on electricity pricing, such as electricity pricing of a regional power grid to which the thermal cycle generator 402 is connected. In some examples, the thermal cycle generator 402 or controller thereof is in data communication with the regional power grid 418 and configured to receive grid information. In some embodiments, the grid information includes load information (e.g., demand). When the grid information indicates a grid load above a load threshold value, the system 400 operates the thermal cycle generator 402 to produce electricity and export the electrical power to the regional power grid 418.

In some embodiments, the thermal cycle generator 402 operates based at least partially on the temperature of the cool-temperature fluid ring 464 and the warm-temperature fluid ring 462 (or a temperature difference therebetween) to transfer heat to and/or from the DHCN rings and maintain target temperatures. In some embodiments, a warm target temperature of the warm-temperature ring 462 is in a target temperature range of 10° C. and 30° C. In some embodiments, a warm target temperature of the warm-temperature ring 462 is approximately 25° C. In some embodiments, a cool target temperature of the cool-temperature ring 464 is in a target temperature range of 0° C. to 15° C. In some embodiments, a cool target temperature of the cool-temperature ring 464 is approximately 5° C. In some embodiments, a target temperature difference of the warm-temperature ring 462 and the cool-temperature ring 464 is in a target temperature difference range of 10° C. and 30° C. In some embodiments, a target temperature difference of the warm-temperature ring 462 and the cool-temperature ring 464 is approximately 25° C. In some embodiments, a target minimum temperature difference of the warm-temperature ring 462 and the cool-temperature ring 464 is approximately 20° C.

In some embodiments, the thermal cycle generator 402 receives heat from and/or transfers heat to one or both of the cool-temperature fluid ring 464 and the warm-temperature fluid ring 462 to raise or lower the respect temperature thereof to stay near the target temperature and/or within the target temperature range. In some embodiments, the thermal cycle generator 402 receives heat from and/or transfers heat to one or both of the cool-temperature fluid ring 464 and the warm-temperature fluid ring 462 to raise or lower the respect temperature thereof to stay near the target temperature difference and/or within the target temperature difference range.

Figure 5:
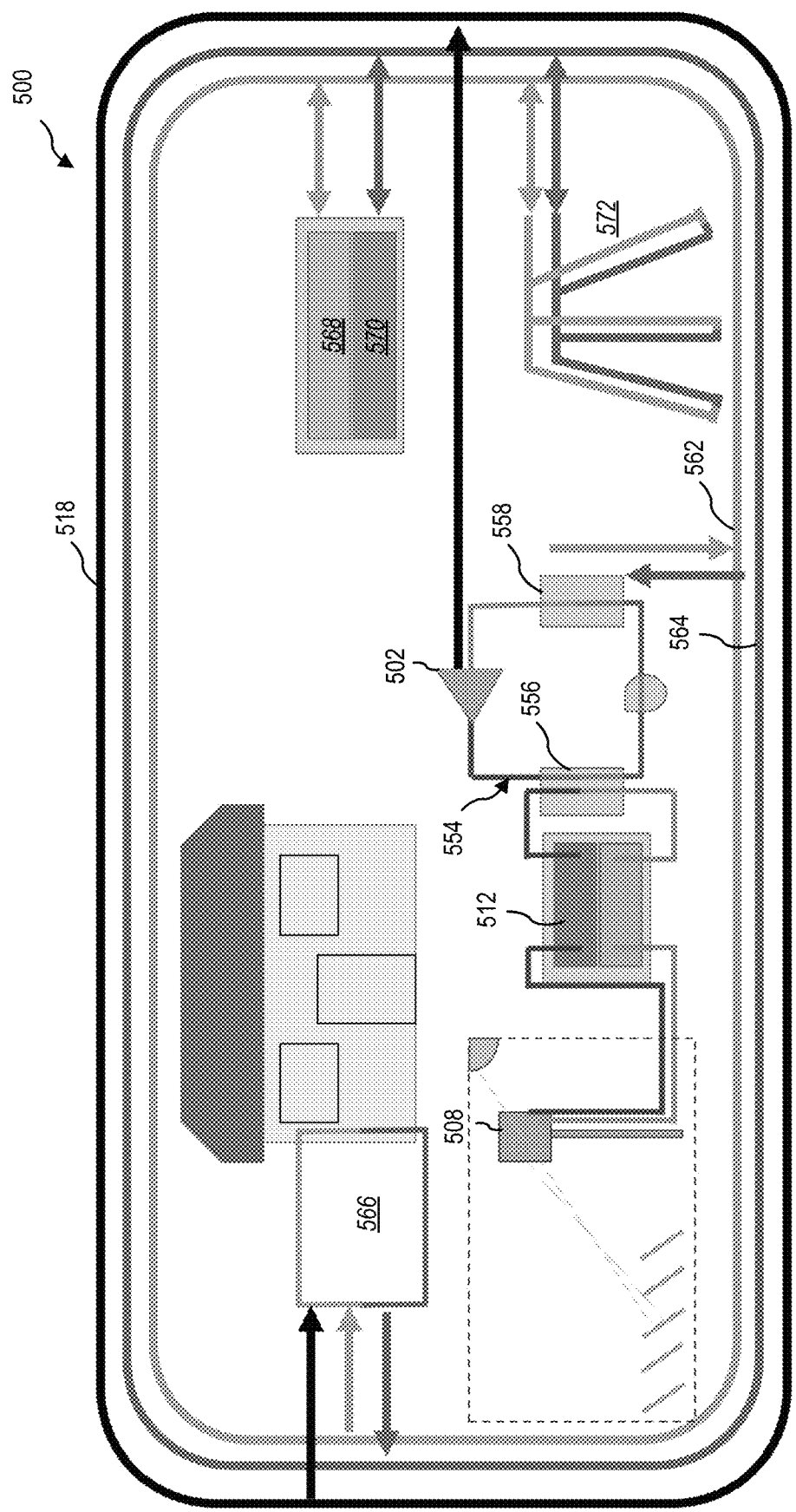
FIG. 5 is a schematic diagram of energy in another integrated concentrated solar energy and district heating and cooling network with thermal storage devices, according to at least some embodiments of the present disclosure.

FIG. 5 illustrates another embodiment of a concentrated solar PV/thermal hybrid generator integrated with a DHCN. In some embodiments, the DHCN includes one or more thermal storage devices to further maintain a temperature of the warm-temperature fluid ring 562 and/or the cool-temperature fluid ring 564. For example, the PV module 508 harvests solar electrical energy and solar thermal energy. The solar thermal energy is, in some embodiments, provided to an HES 512. The solar thermal energy and/or HES 512 heats a generator working fluid 554 and a cool-temperature fluid ring 564 of the DHCN cools the generator working fluid 554.

The generator working fluid 554 is heated at the evaporator 556 before being expanded at the thermal cycle generator 502. The generator working fluid 554 is cooled and condensed at the condenser 558 after the thermal cycle generator 502. In some embodiments, the temperature difference between the HES 512 and the cool-temperature fluid ring 564 is converted to generator electrical energy by the thermal cycle generator 502. The thermal cycle generator 502 may export the electrical energy to a regional power grid 518 or to another storage device, such as a short-term storage device or a long-term storage device, as needed.

In some embodiments, the cool-temperature fluid ring 564 is part of a DHCN that provides heat to one or more structures. In some embodiments, the structure includes a heat pump 566 that provides climate control to the structure based at least partially on a warm-temperature fluid ring 562 of the DHCN and the cool-temperature fluid ring 564 as explained in relation to FIG. 4. For example, the heat pump 566 may transfer heat from the warm-temperature fluid ring 562 of the DHCN to the structure to warm the structure. In some embodiments, the heat pump 566 consumes electrical power from the regional power grid 518 that is supplied, at least partially, by the thermal cycle generator 502. In some embodiments, the thermal cycle generator is activated based on one or more parameters. In some embodiments, the one or more parameters include a temperature of the cool-temperature fluid ring 564. For example, the thermal cycle generator may be activated in response to a temperature of the cool-temperature fluid ring 564 being below a threshold value for efficient thermal cycle generator operation. In some embodiments, the one or more parameters include a temperature difference between the warm-temperature fluid ring 562 and the cool-temperature fluid ring 564. For example, the thermal cycle generator may be activated when the temperature difference is above a second threshold. In such a case, the heat pump may be powered by the regional power grid when the thermal generator is not activated.

In some embodiments, the CES is the warm-temperature fluid ring 562. For example, the condenser 558 may exhaust heat from the generator working fluid 554 to the warm-temperature fluid ring 562. While the cool-temperature fluid ring 564 may provide a larger temperature difference with the HES 512 than the warm-temperature fluid ring 562, it may be beneficial to the DHCN to heat the warm-temperature fluid ring 562 with exhaust heat from generator working fluid 554 after the thermal cycle generator 502. In some embodiments, at least a portion of the fluid from the cool-temperature fluid ring 564 is directed toward the condenser 558 and, subsequently, directed to the warm-temperature fluid ring 562 after receiving heat through the condenser 558.

In some embodiments, a chiller is configured to cool the cool-temperature fluid ring 564. In some embodiments, the chiller is a compression chiller. In some embodiments, the chiller is an absorption chiller. For example, the system 500 may include a chiller or other cooling system to cool the fluid before the condenser 558. In some embodiments, the chiller is configured to cool the fluid of the cool-temperature fluid ring 564. In some embodiments, the chiller is powered by the regional power grid 518. In some embodiments, the chiller is powered at least partially by the thermal cycle generator 502. In some embodiments, the chiller is powered directly by the thermal cycle generator 502. In some embodiments, the chiller is activated based on one or more parameters. In some embodiments, the one or more parameters include a temperature of the cool-temperature fluid ring 564. For example, the chiller may be activated in response to a temperature of the cool-temperature fluid ring 564 being above a third threshold value. In some embodiments, the one or more parameters include a temperature difference between the warm-temperature fluid ring 562 and the cool-temperature fluid ring 564. For example, the chiller may be activated when the temperature difference is above a fourth threshold.

In some embodiments, the system 500 further includes one or more thermal storage devices of the DHCN, such as thermal storage devices that receive heat from or provide heat to the warm-temperature fluid ring 562 and/or the cool-temperature fluid ring 564 of the DHCN to stabilize the temperature of the warm-temperature fluid ring 562 and/or cool-temperature fluid ring 564. In some embodiments, the system 500 includes a high-temperature energy storage device 568 and/or a low-temperature energy storage device 570. In some embodiments, one or more of the high-temperature energy storage device 568 and/or a low-temperature energy storage device 570 is a fluid tank that contains a fluid mass to store the thermal energy at a substantially stable temperature. In some embodiments, one or more of the high-temperature energy storage device 568 and/or a low-temperature energy storage device 570 is a fluid pit (e.g., in-ground or underground) that contains a fluid mass to provide inertia to the warm-temperature fluid ring 562 and/or cool-temperature fluid ring 564 (i.e., a volume of fluid at a substantially stable temperature).

In some embodiments, one or more of the high-temperature energy storage device 568 and/or a low-temperature energy storage device 570 is a solid thermal mass that stores the thermal energy at a substantially stable temperature. For example, the solid thermal mass may be a metallic thermal mass. In some examples, the solid thermal mass is a mass of sand. In some examples, the solid thermal mass is a mass of concrete. In some embodiments, one or more of the high-temperature energy storage device 568 and/or a low-temperature energy storage device 570 is a natural structural or thermal mass that stores the thermal energy at a substantially stable temperature. In some examples, one or more of the high-temperature energy storage device 568 and/or a low-temperature energy storage device 570 is a naturally-occurring water reservoir (surface water or subsurface water).

In some embodiments, the warm-temperature fluid ring 562 and/or the cool-temperature fluid ring 564 are configured to provide heat to and/or receive heat from a borehole heat exchanger arranged in a geothermal well including one or more wellbores. The borehole heat exchanger exchanges heat with the ground (i.e., subsurface) and provides another source of heat or coolth based on building demand that is in fluid communication with the cold fluid ring and/or hot fluid ring. For instance, the borehole heat exchanger may receive DHCN fluid from a cold fluid ring and redirect it to the warm fluid ring once it had circulated in the borehole heat exchanger and/or receive DHCN fluid from the warm fluid ring and redirect it to the cold fluid ring once it has circulated in the heat exchanger.

While the embodiment of FIG. 5 illustrates a high-temperature energy storage device 568, a low-temperature energy storage device 570, and a geothermal storage well 572, it should be understood that other embodiments include a plurality of any of a high-temperature energy storage device 568, a low-temperature energy storage device 570, and a geothermal storage well 572. While the embodiment of FIG. 5 illustrates a high-temperature energy storage device 568, a low-temperature energy storage device 570, and a geothermal storage well 572, it should be understood that other embodiments lack a high-temperature energy storage device 568, a low-temperature energy storage device 570, a geothermal storage well 572, or combinations thereof. For example, a system 500 may include a high-temperature energy storage device 568 and a low-temperature energy storage device 570 without a geothermal storage well 572. In some examples, a system 500 may include a geothermal storage well 572 without a high-temperature energy storage device 568 and a low-temperature energy storage device 570. In some examples, a system 500 may only have one type of thermal energy storage device (e.g., a high-temperature energy storage device 568 or a low-temperature energy storage device 570) and lack the other. In some examples, a system 500 may only have one type of thermal energy storage device (e.g., a high-temperature energy storage device 568 or a low-temperature energy storage device 570) and include a geothermal storage well 572.

In some embodiments, the system 500 and/or the thermal cycle generator 502 operate based at least partially on electricity demand, electricity price, thermodynamic efficiency, target temperatures of the DHCN rings, or combinations thereof, such as described in relation to FIG. 4.

Figure 6:
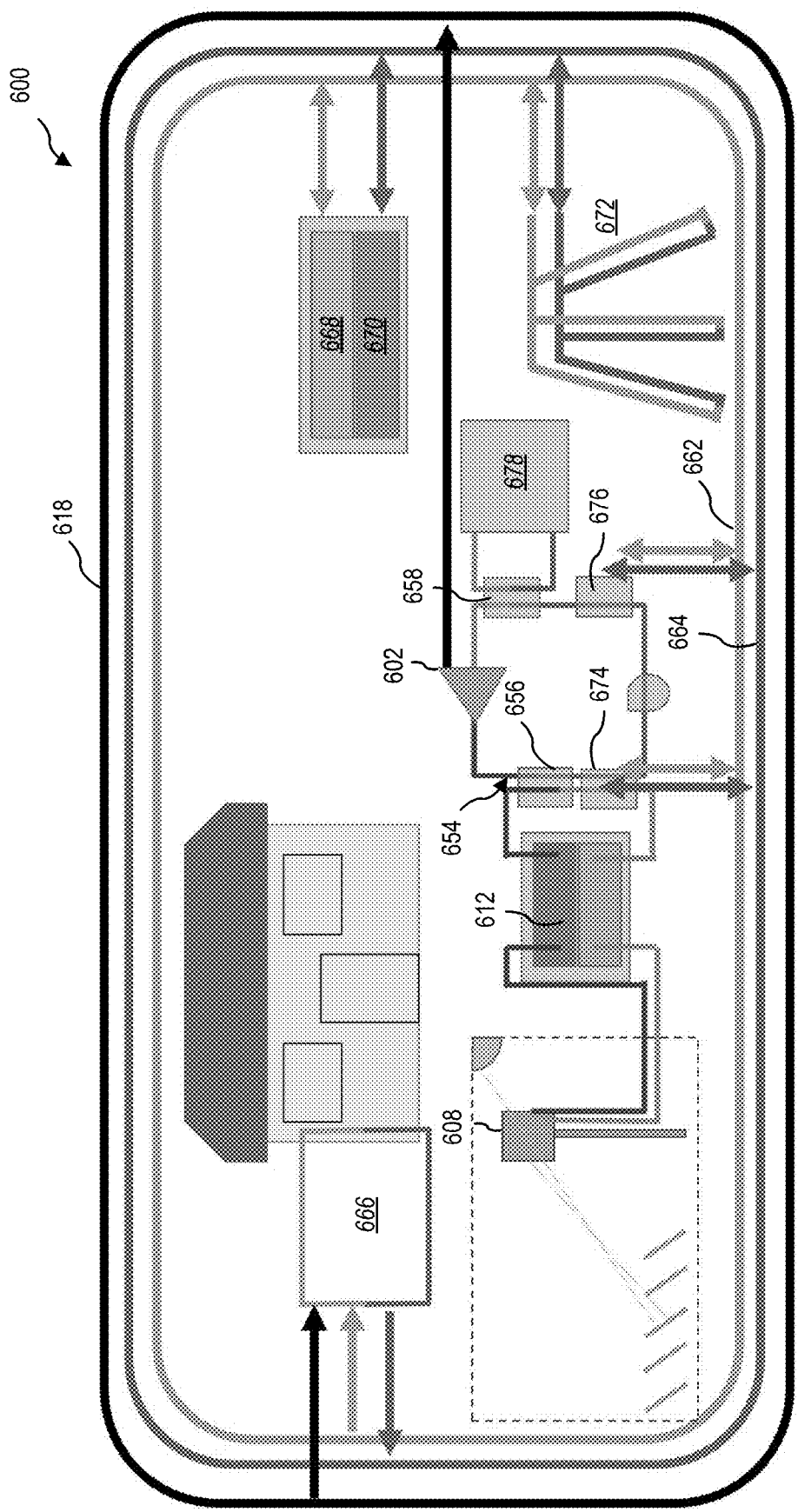
FIG. 6 is a schematic diagram of energy in another integrated concentrated solar energy and district heating and cooling network with a subcooler and/or preheater, according to at least some embodiments of the present disclosure.

FIG. 6 illustrates another embodiment of a concentrated solar PV/thermal hybrid generator integrated with a DHCN. In some embodiments, the DHCN includes one or more thermal storage devices to further maintain a temperature of the warm-temperature fluid ring 662 and/or the cool-temperature fluid ring 664. For example, the PV module 608 harvests solar electrical energy and solar thermal energy. The solar thermal energy is, in some embodiments, provided to an HES 612. The solar thermal energy and/or HES 612 heats a generator working fluid 654 and a cool-temperature fluid ring 664 of the DHCN cools the generator working fluid 654.

The generator working fluid 654 is heated at the evaporator 656 before being expanded at the thermal cycle generator 602. The generator working fluid 654 is cooled and condensed at the condenser 658 after the thermal cycle generator 602. In some embodiments, the temperature difference between the HES 612 and the cool-temperature fluid ring 664 is converted to generator electrical energy by the thermal cycle generator 602. The thermal cycle generator 602 may export the electrical energy to a regional power grid 618 or to another storage device, such as a short-term storage device or a long-term storage device, as needed.

In some embodiments, the cool-temperature fluid ring 664 is part of a DHCN that provides heat to one or more structures. In some embodiments, the structure includes a heat pump 666 that provides climate control to the structure based at least partially on a warm-temperature fluid ring 662 of the DHCN and the cool-temperature fluid ring 664. For example, the heat pump 666 may transfer heat from the warm-temperature fluid ring 662 of the DHCN to the structure to warm the structure. In some embodiments, the heat pump 666 consumes electrical power from the regional power grid 618 that is supplied, at least partially, by the thermal cycle generator 602. In some embodiments, the thermal cycle generator is activated based on one or more parameters. In some embodiments, the one or more parameters include a temperature of the cool-temperature fluid ring 564. For example, the thermal cycle generator may be activated in response to a temperature of the cool-temperature fluid ring 564 being below a threshold value for efficient thermal cycle generator operation. In some embodiments, the one or more parameters include a temperature difference between the warm-temperature fluid ring 562 and the cool-temperature fluid ring 564. For example, the thermal cycle generator may be activated when the temperature difference is above a second threshold. In such a case, the heat pump may be powered by the regional power grid when the thermal generator is not activated.

In some embodiments, the CES is the warm-temperature fluid ring 662. For example, the condenser 658 may exhaust heat from the generator working fluid 654 to the warm-temperature fluid ring 662. While the cool-temperature fluid ring 664 may provide a larger temperature difference with the HES 612 than the warm-temperature fluid ring 662, it may be beneficial to the DHCN to heat the warm-temperature fluid ring 662 with exhaust heat from generator working fluid 654 after the thermal cycle generator 602. In some embodiments, the condenser 658 exhausts heat from the generator working fluid 654 to water or other fluid from the cool-temperature fluid ring 664, and the heated fluid is then added to the warm-temperature fluid ring 662.

In some embodiments, the system 600 further includes one or more thermal storage devices of the DHCN, such as thermal storage devices that receive heat from or provide heat to the warm-temperature fluid ring 662 and/or the cool-temperature fluid ring 664 of the DHCN to stabilize the temperature of the warm-temperature fluid ring 662 and/or cool-temperature fluid ring 664. In some embodiments, the system 600 includes a high-temperature energy storage device 668 and/or a low-temperature energy storage device 670. In some embodiments, one or more of the high-temperature energy storage device 668 and/or a low-temperature energy storage device 670 is a fluid tank that contains a fluid mass to store the thermal energy at a substantially stable temperature. In some embodiments, one or more of the high-temperature energy storage device 668 and/or a low-temperature energy storage device 670 is a fluid pit (e.g., in-ground or underground) that contains a fluid mass to store the thermal energy at a substantially stable temperature. In some embodiments, one or more of the high-temperature energy storage device 668 and/or a low-temperature energy storage device 670 is a fluid pit thermal storage device (e.g., in-ground or underground) that contains a fluid mass to provide inertia to the warm-temperature fluid ring 662 and/or cool-temperature fluid ring 664 (i.e., a volume of fluid at a substantially stable temperature).

In some embodiments, one or more of the high-temperature energy storage device 668 and/or a low-temperature energy storage device 670 is a solid thermal mass that stores the thermal energy at a substantially stable temperature. For example, the solid thermal mass may be a metallic thermal mass. In some examples, the solid thermal mass is a mass of sand. In some examples, the solid thermal mass is a mass of concrete. In some embodiments, one or more of the high-temperature energy storage device 668 and/or a low-temperature energy storage device 670 is a natural structural or thermal mass that stores the thermal energy at a substantially stable temperature. In some examples, one or more of the high-temperature energy storage device 668 and/or a low-temperature energy storage device 670 is a naturally-occurring water reservoir (surface water or subsurface water). In some embodiments, the warm-temperature fluid ring 662 and/or the cool-temperature fluid ring 664 are configured to provide heat to and/or receive heat from a geothermal storage well 672. While the embodiment of FIG. 6 illustrates a high-temperature energy storage device 668, a low-temperature energy storage device 670, and a geothermal storage well 672, it should be understood that other embodiments include a plurality of any of a high-temperature energy storage device 668, a low-temperature energy storage device 670, and a geothermal storage well 672.

While the embodiment of FIG. 6 illustrates a high-temperature energy storage device 668, a low-temperature energy storage device 670, and a geothermal storage well 672, it should be understood that other embodiments lack a high-temperature energy storage device 668, a low-temperature energy storage device 670, a geothermal storage well 672, or combinations thereof. For example, a system 600 may include a high-temperature energy storage device 668 and a low-temperature energy storage device 670 without a geothermal storage well 672. In some examples, a system 600 may include a geothermal storage well 672 without a high-temperature energy storage device 668 and a low-temperature energy storage device 670. In some examples, a system 600 may only have one type of thermal energy storage device (e.g., a high-temperature energy storage device 668 or a low-temperature energy storage device 670) and lack the other. In some examples, a system 600 may only have one type of thermal energy storage device (e.g., a high-temperature energy storage device 668 or a low-temperature energy storage device 670) and include a geothermal storage well 672.

In some embodiments, the system 600 further includes a preheater 674 that heats the generator working fluid 654 before the evaporator 656. In some embodiments, the system 600 further includes a subcooler 676 that cools the generator working fluid 654 after the condenser 658. In some embodiments, the system 600 further includes a preheater 674 that heats the generator working fluid 654 before the evaporator 656 and a subcooler 676 that cools the generator working fluid 654 after the condenser 658. The preheater 674 increases a temperature of the generator working fluid 654 prior to the evaporator 656. Boiling the generator working fluid 654 requires overcoming the latent heat of boiling of the generator working fluid 654. In some embodiments, preheating the generator working fluid 654 closer to the boiling temperature of the generator working fluid 654 prior to the evaporator 656 may allow a more complete or more efficient expansion of the generator working fluid 654 into a vapor state in the evaporator 656.

In some embodiments, the subcooler 676 receives heat from the generator working fluid 654 after the condenser 658 to exhaust heat from the generator working fluid 654 and lower a temperature of the generator working fluid 654 after the condenser 658. In some embodiments, it may be beneficial to cool the generator working fluid 654 farther below the boiling temperature (e.g., condensation temperature). In some embodiments, the condenser 658 exhausts heat through a condenser heat exchanger 678 to another process or portion of the DHCN or other system. In some embodiments, the condenser heat exchanger 678 exhaust the heat to ambient atmosphere. In some embodiments, the condenser heat exchanger 678 exhausts heat to another component of the system 600, such as a high-temperature energy storage device 668. In some embodiments, the condenser heat exchanger 678 exhausts heat to another system, such as distillation, food processing, manufacturing, etc.

In some embodiments, the preheater 674 receives heat from the warm-temperature fluid ring 662. For example, the warm-temperature fluid ring 662 may raise a temperature of the generator working fluid 654 closer to the boiling temperature of the generator working fluid 654. In some embodiments, the preheater 674 receives heat from the cool-temperature fluid ring 664. For example, the cool-temperature fluid ring 664 may be at a temperature greater than the generator working fluid 654 after the condenser 658, and generator working fluid 654 may, therefore, help cool the cool-temperature fluid ring 664.

In some embodiments, the subcooler 676 exhausts heat to the warm-temperature fluid ring 662. For example, the subcooler 676 may transfer heat from the generator working fluid 654 to the warm-temperature fluid ring 662 to raise or maintain a temperature of the warm-temperature fluid ring 662. In some embodiments, the subcooler 676 exhausts heat from the cool-temperature fluid ring 664. For example, the cool-temperature fluid ring 664 may be at a temperature lower than the warm-temperature fluid ring 662 and, therefore, cool the generator working fluid 654 more than the warm-temperature fluid ring 662 in the subcooler 676. In some embodiments, the system 600 includes a preheater 674 without a subcooler 676. In some embodiments, the system 600 includes a subcooler 676 without a preheater 674.

In some embodiments, the system 600 and/or the thermal cycle generator 602 operate based at least partially on electricity demand, electricity price, thermodynamic efficiency, target temperatures of the DHCN rings, or combinations thereof, such as described in relation to FIG. 4.

Figure 7:
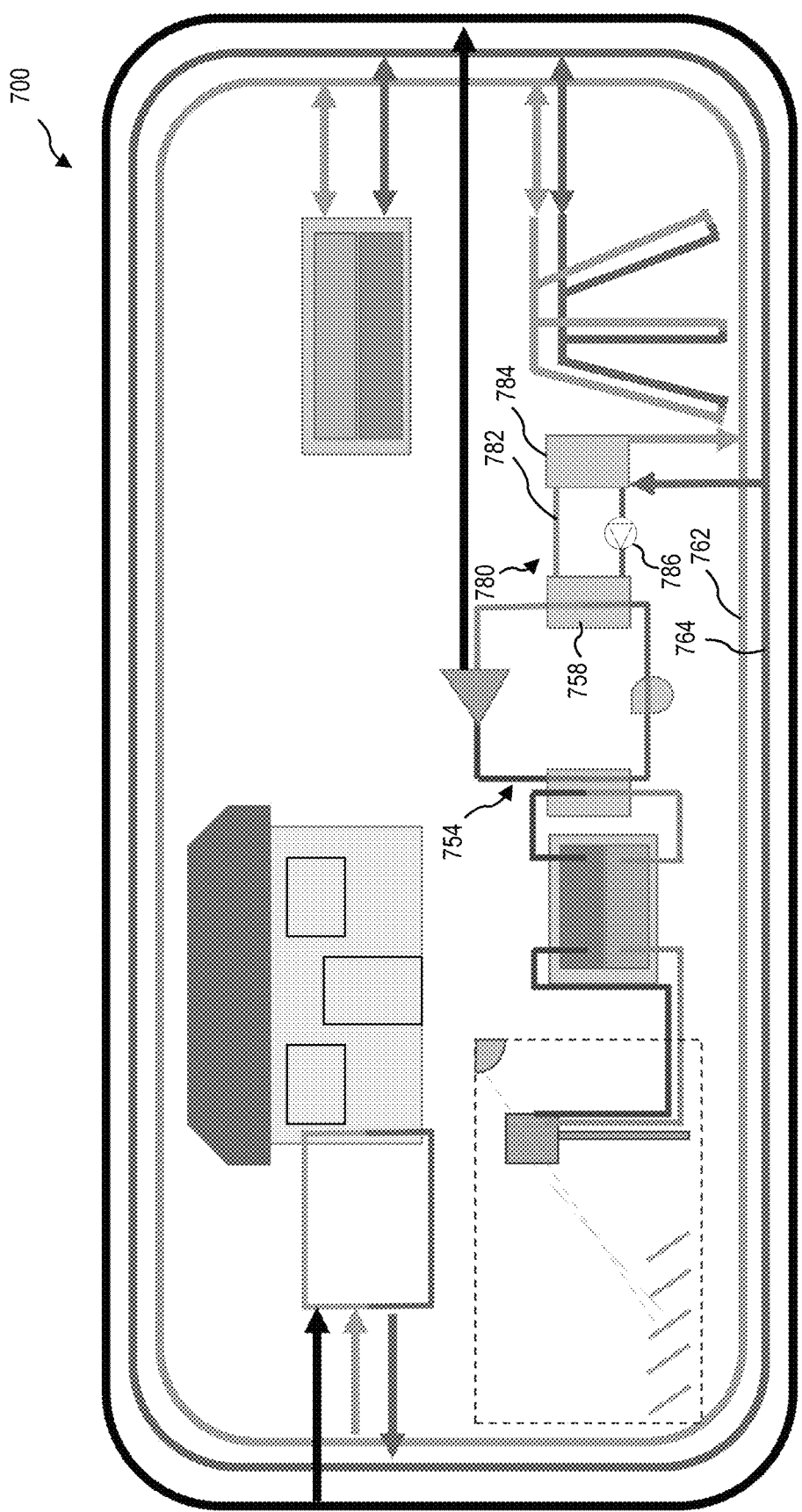
FIG. 7 is a schematic diagram of energy in another integrated concentrated solar energy and district heating and cooling network with a selective transfer fluid loop, according to at least some embodiments of the present disclosure.

Referring now to FIG. 7, in some embodiments, a system 700 includes a transfer fluid loop 780 that selectively transfers thermal energy between the generator working fluid 754 of the thermal cycle generator 702 and the warm-temperature fluid ring 762 and/or the cool-temperature fluid ring 764 of the DHCN. For example, a system 700 may include any combination of the components described herein, and the transfer fluid loop 780 may allow adjustments to the rate of thermal transfer between the generator working fluid 754 and the warm-temperature fluid ring 762 and/or the cool-temperature fluid ring 764.

In some embodiments, the transfer fluid loop 780 includes a transfer working fluid 782 that flows between the condenser 758 and a ring heat exchanger 784. The transfer working fluid 782 receives heat from the generator working fluid 754 at the condenser 758 to condense the generator working fluid 754 and exhausts the heat to the DHCN at the ring heat exchanger 784. In some embodiments, the ring heat exchanger 784 heats water or another district working fluid from the cool-temperature fluid ring 764 and the heated water flows into the warm-temperature fluid ring 762, thereby maintaining or increasing a temperature difference between the warm-temperature fluid ring 762 and the cool-temperature fluid ring 764. In some embodiments, a pump 786 selectively adjusts a flow rate of the transfer working fluid 782 in the transfer fluid loop 780. In some embodiments, a higher flow rate increases the amount of heat transferred in the transfer fluid loop 780. In some embodiments, a lower flow rate increases the amount of time the transfer working fluid is in the condenser 758, reducing a temperature difference between the transfer working fluid 782 and the generator working fluid 754 and an associated thermal transfer rate therebetween heat transferred in the transfer fluid loop 780.

In some embodiments, the system 700 and/or the thermal cycle generator 702 operate based at least partially on electricity demand, electricity price, thermodynamic efficiency, target temperatures of the DHCN rings, or combinations thereof, such as described in relation to FIG. 4.

Figure 8:
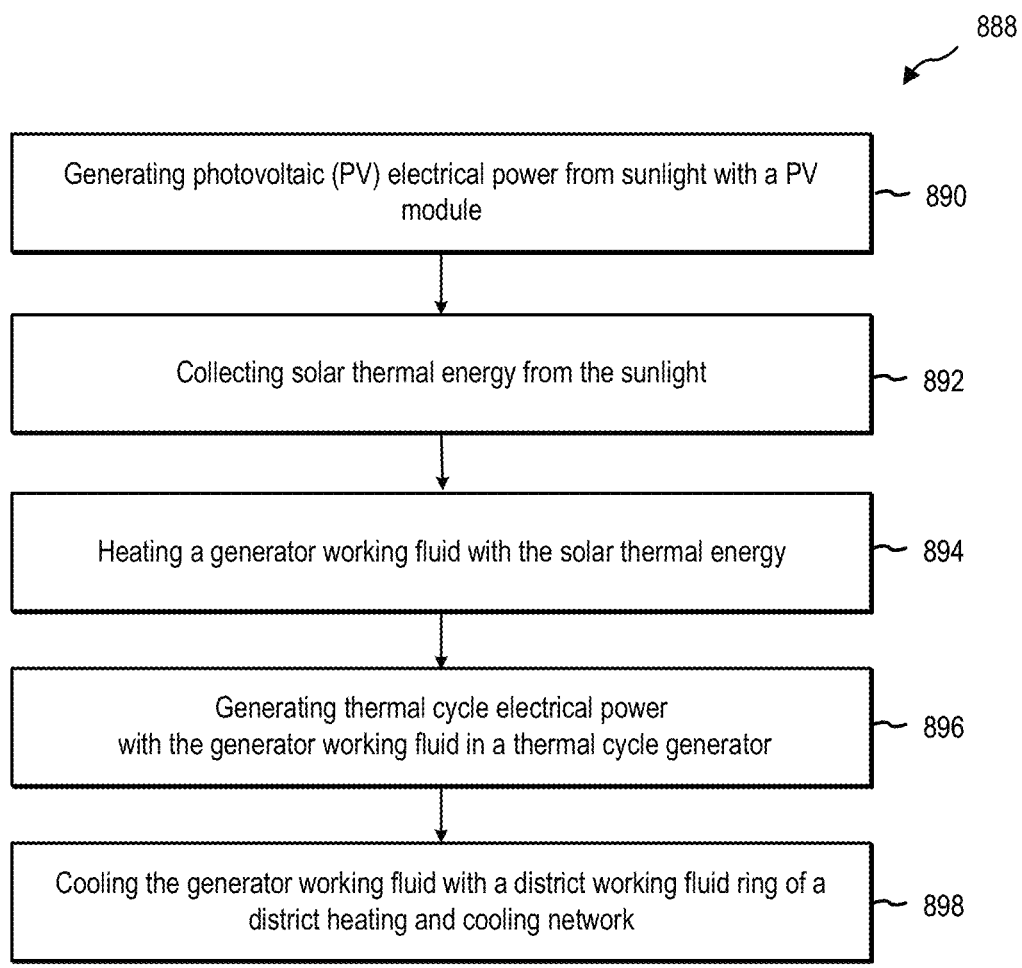
FIG. 8 is a flowchart illustrating a method of providing energy, according to at least some embodiments of the present disclosure.

FIG. 8 is a flowchart illustrating a method of providing energy according to the present disclosure. In some embodiments, the method 888 includes generating solar electrical power from sunlight with a PV module of a solar thermal collector (such as described in relation to FIGS. 1, 2, 4, 5, and 6) at 890 and collecting solar thermal energy from the sunlight with the solar thermal collector at 892 (such as described in relation to FIGS. 1, 2, 4, 5, and 6). In some embodiments, the method 888 further includes heating a generator working fluid with the solar thermal energy at 894 and generating thermal cycle electrical power in a thermal cycle generator (such as ORC electrical power in an ORC generator) at 896. The method 888 further includes cooling the generator working fluid with a district working fluid ring of a DHCN at 898. In some embodiments, the district working fluid ring is a warm-temperature fluid ring of the DHCN and the method further comprises cooling a cool-temperature fluid ring of the DHCN at least partially with the solar electrical power. For example, the generator working fluid transfers at least a portion of the solar thermal energy to the warm-temperature fluid ring of the DHCN, and the solar electrical power may at least partially power a chiller to cool the cool-temperature fluid ring. The hybrid solar PV/thermal system may, thereby, generate power and create or maintain a temperature difference between the warm-temperature fluid ring and the warm-temperature fluid ring of the DHCN.

The present disclosure relates to systems and methods for providing energy according to any of the following:

Clause 1. A system for providing electrical power, the system comprising: a solar thermal collector including a photovoltaic (PV) module, wherein the solar thermal collector is configured to convert a first portion of sunlight to thermal energy and a second portion of the sunlight to electrical energy; a thermal cycle generator including a generator working fluid, wherein the generator working fluid receives heat from the solar thermal collector and exhausts heat to a district working fluid; and a district working fluid ring of a district heating and cooling network (DHCN) configured to receive heat from the thermal cycle generator with the district working fluid therein.

Clause 2. The system of clause 1, further comprising a hot energy storage (HES) between the solar thermal collector and the thermal cycle generator.

Clause 3. The system of clause 2, wherein the HES is a fluid tank.

Clause 4. The system of clause 2, wherein the HES is a geothermal storage well.

Clause 5. The system of any preceding clause, wherein the district working fluid ring receives heat from the generator working fluid in a condenser of the thermal cycle generator.

Clause 6. The system of any preceding clause, further comprising a cold energy storage (CES) in thermal communication with the district working fluid.

Clause 7. The system of clause 6, wherein the CES is a fluid tank.

Clause 8. The system of clause 6, wherein the CES is a geothermal storage well.

Clause 9. The system of any preceding clause, wherein district working fluid ring is a warm-temperature ring.

Clause 10. The system of any of clauses 1-8, wherein district working fluid ring is a cool-temperature ring.

Clause 11. The system of any preceding clause, further comprising a heat pump configured to receive heat from the district working fluid and exhaust the heat.

Clause 12. The system of any preceding clause, wherein at least a portion of the electricity is provided to the heat pump.

Clause 13. The system of any preceding clause, further comprising: a transfer working fluid configured to receive heat from the generator working fluid at a condenser of the thermal cycle generator and transfer heat to the district working fluid.

Clause 14. A system for providing electrical power, the system comprising: a solar thermal collector including a photovoltaic (PV) module, wherein the solar thermal collector is configured to convert a first portion of sunlight to solar thermal energy and a second portion of the sunlight to solar electrical energy; an organic Rankine cycle (ORC) generator including a generator working fluid, wherein the generator working fluid receives heat at an evaporator that is heated at least partially by the solar thermal energy and exhausts heat to a district working fluid; and a district working fluid ring of a district heating and cooling network (DHCN) configured to receive heat from the ORC generator with the district working fluid therein.

Clause 15. The system of clause 14, further including a preheater configured to heat the generator working fluid prior to the evaporator.

Clause 16. The system of clause 15, wherein the preheater receives district thermal energy from a warm-temperature fluid ring of the DHCN.

Clause 17. The system of clause 15, wherein the preheater receives district thermal energy from a cool-temperature fluid ring of the DHCN.

Clause 18. The system of any of clauses 14-17, further including a subcooler configured to cool the generator working fluid after a condenser.

Clause 19. The system of clause 18, wherein the subcooler exhausts heat to a warm-temperature fluid ring of the DHCN.

Clause 20. The system of clause 18, wherein the subcooler exhausts heat to a cool-temperature fluid ring of the DHCN.

Clause 21. A method of providing electrical power, the method comprising: generating solar electrical power with a PV module of a solar thermal collector; collecting solar thermal energy from the solar thermal collector; heating a generator working fluid with the solar thermal energy; generating organic Rankine cycle (ORC) electrical power in an ORC generator; and cooling the generator working fluid with a district working fluid ring of a district heating and cooling network (DHCN).

Clause 22. The method of clause 21, wherein the district working fluid ring is a warm-temperature fluid ring of the DHCN and the method further comprises cooling a cool-temperature fluid ring of the DHCN at least partially with the solar electrical power.

Clause 23. The method of clause 21, further comprising transferring heat from the district working fluid ring to a building with a heat pump.

Clause 24. The method of clause 23, wherein at least a portion of the ORC electrical power is provided to the heat pump.

Clause 25. The system or method of any preceding clause, wherein the thermal cycle generator is configured to operate based at least partially on a temperature of a warm-temperature fluid ring of the DHCN.

Clause 26. The system or method of any preceding clause, wherein the thermal cycle generator is configured to operate based at least partially on a temperature of a cool-temperature fluid ring of the DHCN.

Clause 27. The system or method of any preceding clause, wherein the thermal cycle generator is configured to operate based at least partially on a temperature difference of a warm-temperature fluid ring and a cool-temperature fluid ring of the DHCN.

Clause 28. The system or method of any preceding clause, wherein the thermal cycle generator is configured to operate based at least partially on grid information received from a regional power grid.

Clause 29. The system or method of clause 28, wherein the grid information includes grid pricing information.

Clause 30. The system or method of clause 28, wherein the grid information includes grid load information.

It should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive. Numbers, percentages, ratios, or other values stated herein are intended to include that value, and also other values that are "about", "substantially", or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. The described embodiments are therefore to be considered as illustrative and not restrictive, and the scope of the disclosure is indicated by the appended claims rather than by the foregoing description.

What is claimed is:

1. A system for providing electrical power, the system comprising:
   a solar thermal collector including a photovoltaic (PV) module, wherein the solar thermal collector is configured to convert a first portion of sunlight to thermal energy and a second portion of the sunlight to electrical energy;
   a thermal cycle generator configured to generate electricity including a generator working fluid, wherein the generator working fluid receives heat from the solar thermal collector and exhausts the heat to a district working fluid;
   a district working fluid ring of a district heating and cooling network (DHCN) configured to receive heat from the thermal cycle generator with the district working fluid therein, wherein the district working fluid ring includes a warm-temperature fluid ring or a cool-temperature fluid ring; and a preheater configured to heat the generator working fluid before an evaporator, wherein the preheater receives district thermal energy from at least one of the warm-temperature fluid ring of the DHCN or the cool-temperature fluid ring of the DHCN.

2. The system of claim 1, further comprising a hot energy storage (HES) between the solar thermal collector and the thermal cycle generator.

3. The system of claim 2, wherein the HES includes a pit thermal energy storage.

4. The system of claim 1, wherein the district working fluid ring receives heat from the generator working fluid in a condenser of the thermal cycle generator.

5. The system of claim 1, further comprising a cold energy storage (CES) in thermal communication with the district working fluid.

6. The system of claim 5, wherein the CES includes a pit thermal energy storage.

7. The system of claim 1, wherein the district working fluid ring includes the warm-temperature fluid ring.

8. The system of claim 1, wherein the district working fluid ring includes the cool-temperature fluid ring.

9. The system of claim 1, wherein the DHCN further comprises at least a heat pump configured to receive heat from the district working fluid and exhaust the heat to a building.

10. The system of claim 9, wherein at least a portion of the electricity generated by the thermal cycle generator is provided to the heat pump.

11. The system of claim 1, wherein at least a portion of the electricity is provided to an electrical network connected to the thermal cycle generator.

12. The system of claim 1, further comprising:
a transfer working fluid configured to receive heat from the generator working fluid at a condenser of the thermal cycle generator and transfer the heat to the district working fluid.

13. The system of claim 1, wherein the thermal cycle generator is an Organic Rankine Cycle (ORC) or a Kalina cycle generator.

14. The system of claim 1, further including a subcooler configured to cool the generator working fluid after a condenser, wherein the subcooler exhausts heat to at least one of the warm-temperature fluid ring of the DHCN or the cool-temperature fluid ring of the DHCN.

* * * * *